United States Patent [19]

Guenthner et al.

[11] Patent Number: 4,594,660

[45] Date of Patent: Jun. 10, 1986

[54] COLLECTOR

[75] Inventors: Russell W. Guenthner; Gregory C. Edgington, both of Glendale; Leonard G. Trubisky, Scottsdale; Joseph C. Circello, Phoenix, all of Ariz.

[73] Assignee: Honeywell Information Systems Inc., Phoenix, Ariz.

[21] Appl. No.: 434,129

[22] Filed: Oct. 13, 1982

[51] Int. Cl.⁴ .......................... G06F 9/28; G06F 9/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,346,851 | 10/1967 | Thornton et al. | 364/200 |
| 3,449,722 | 6/1969 | Tucker | 364/200 |
| 4,145,755 | 3/1979 | Suzuki et al. | 364/900 |
| 4,365,311 | 12/1982 | Fukunaga et al. | 364/900 |
| 4,393,465 | 7/1983 | Potash | 364/900 |

Primary Examiner—Eddie P. Chan
Attorney, Agent, or Firm—A. A. Sapelli; J. S. Solakian; A. Medved

[57] ABSTRACT

A collector for the results of a pipelined central processing unit of a digital data processing system. The processor has a plurality of execution units, with each execution unit executing a different set of instructions of the instruction repertoire of the processor. The execution units execute instructions issued to them in order of issuance by the pipeline and in parallel. As instructions are issued to the execution units, the operation code identifying each instruction is also issued in program order to an instruction execution queue of the collector. The results of the execution of each instruction by an execution unit are stored in a result stack associated with each execution unit. Collector control causes the results of the execution of instructions to program visible registers to be stored in a master safe store register in program order which is determined by the order of instructions stored in the instruction execution stack on a first-in, first-out basis. The collector also issues write commands to write results of the execution of instructions into memory in program order.

19 Claims, 6 Drawing Figures

COLLECTOR

CROSS-REFERENCE TO RELATED APPLICATIONS

The following copending concurrently filed applications relate to the present application and are incorporated herein by reference:

A. "Central Processor" invented by William A. Shelly and Leonard G. Trubisky Ser. No. 06/434,122 filed Oct. 13, 1982 now U.S. Pat. No. 4,521,851;

B. "Method and Apparatus for Prefetching Instructions" invented by Russell W. Guenthner, William A. Shelly, Gary R. Presley-Nelson, and Kala J. Marietta Ser. No. 06/434,197 filed Oct. 13, 1982;

C. "Method and Apparatus for Initiating the Execution of Instructions" invented by John E. Wilhite, William A. Shelly, Russell W. Guenthner, Leonard G. Trubisky, and Joseph C. Circello Ser. No. 06/434,196 filed Oct. 13, 1982 now U.S. Pat. No. 4,471,432; and D. "Distributor" invented by John E. Wilhite and William A. Shelly Ser. No. 06/434,126 filed Oct. 13, 1982.

All of the foregoing are assigned to the same assignee.

BACKGROUND OF THE INVENTION

1. Field of the Invention

This invention is in the field of digital data processing systems in which the central processor of the system includes a plurality of execution units. Each of the execution units executes a different subset of the instructions constituting the repertoire of the processor. The execution units are independent of each other and act in parallel. More particularly, this invention relates to a collector in which the results of the execution of instructions by the execution units are received and stored in program order and in which a current copy of the program addressable registers of the central processor is maintained, which copy is available for recovering from faults.

2. Description of the Prior Art

Typically, in the prior art central processing systems, the processor includes circuits for producing the addresses of the instruction words, fetching the instruction from memory, preparing the addresses of operands, fetching the operands from memory, loading data into designated registers, excecuting the instruction and, when the results are produced, writing the results into memory or into program visible registers.

To increase the performance, i.e., throughput, of data processing systems, various modifications have been incorporated in central processing units. To reduce the time required to obtain operands and instructions, high-speed caches located in the processor have been provided. In order to speed up the systems, the systems are synchronized, i.e., a clock produces clock pulses which control each step of the operation of a central processing unit. In pipelined processors, the steps of preparing and fetching the instructions and the operands are overlapped to increase performance.

Because some instructions in a synchronous data processing system take many more clock periods than others, or much more time than others to execute, there is an imbalance in the time required to execute different instructions. One solution to this problem is to divide the processor into a plurality of execution units, where each execution unit will execute a subset of the instruction repertoire of the processor. Executing more than one instruction at a time by operating the execution units in parallel increases the throughput of the processor; however, if the processor is provided with multiple execution units which execute instructions in parallel, there is a need, or requirement, to make certain that the results of the execution of instructions by each of the execution units are assembled in program order so that the data that is written into memory and into the program visible registers is written in proper order. It is also necessary that there be readily available a current and correct copy of the contents of the program addressable registers to allow for precise handling of faults and interrupts, and to allow for recovering from hardware errors.

SUMMARY OF THE INVENTION

The present invention provides a collector for a central processor of a digital data processing system. The processor has a given repertoire of instructions and a plurality of execution units. Each of the execution units has the capability of executing a different set of instructions of the instruction repertoire. The central pipeline unit of the processor supplies the necessary instructions and operands to an execution unit having the capability of performing the instructions. The instructions and operands are supplied in program order. As the instructions are applied to the execution unit that can execute the instruction in program order, the operational code of the instruction word and other relevant information are transmitted to an instruction execution queue in program order. All but one of the execution units is provided with an input stack which is capable of stacking input instructions in the order received. Each execution unit is provided with a result stack into which is placed the results of the execution of the instructions. Each execution unit executes the instructions applied to it by the pipeline unit in the order the instructions are received. The master safe store and the store stack of the collector then have applied to them the results of the execution of all instructions with the results being taken from the execution unit results stacks in program order. The control portion of the collector uses the instruction code stored in the first, or bottom, entry of the first-in, first-out stack of the instruction execution queue to enable the transmission of the result of the execution of that instruction from the result stack of the appropriate execution unit to either the master safe store or to the store stack. A valid copy of the program visible registers of the CPU is maintained in the master safe store and the data to be written into memory is placed in the store stack prior to being written into memory, or into cache memory.

It is, therefore, an object of this invention to provide a collector which allows for increased throughput of the central processor.

It is another object of this invention to provide a collector for a central processing unit having several execution units in which the results of the instructions in program order are received and stored in the collector.

It is yet another object of this invention to provide a collector having a master safe store in which a valid copy of the data stored in program visible registers is stored.

It is still another object of this invention to provide improved apparatus for fault handling and recovery and for interupt handling in a pipelined processor.

It is still another object of this invention to provide apparatus which provides an improved capability for hardware instruction retry.

It is a further object of this invention to provide a collector which allows the execution units to operate independently and in parallel without interference from each other and permits precise fault handling, interrupt handling, and error recovery without deleteriously impacting the performance of the individual execution units, and without requiring the execution units to delay between execution of instructions.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
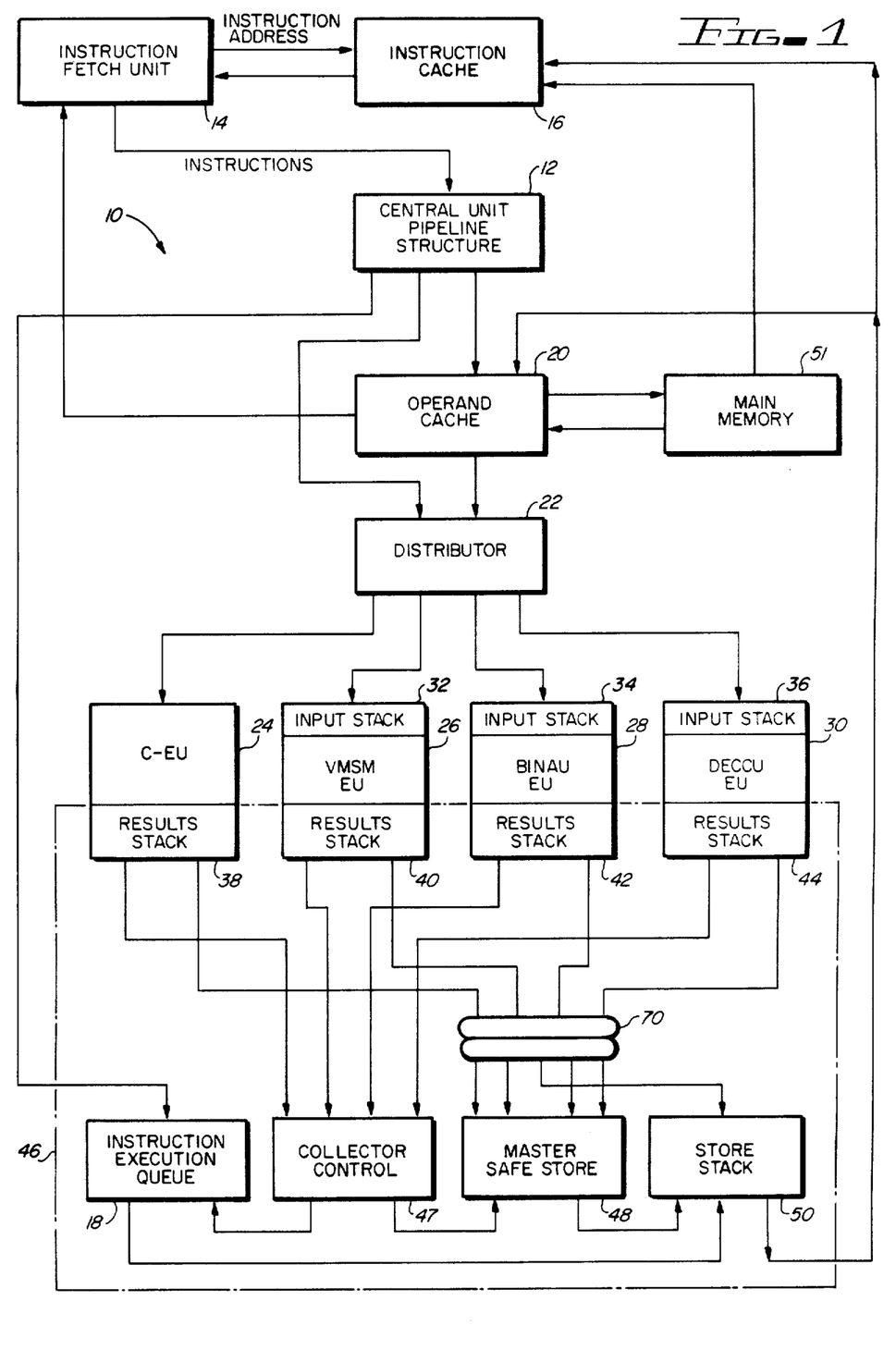
FIG. 1 is a block diagram of a central processing unit (CPU) of a general-purpose data processing system provided with the collector of this invention.

In FIG. 1, the major components, or subsystems, of a central processing unit 10 are illustrated. The central unit pipeline structure 12 controls the overall operation of processor 10. The instruction fetch unit 14 supplies, or transmits, the addresses of instruction words to the instruction cache 16. In response to the instruction address being applied to the instruction cache 16 from instruction fetch unit 14, an instruction word is transmitted from cache 16 to instruction fetch unit 14 which, in turn, forwards instruction words to the central unit pipeline structure 12. Central unit pipeline 12 decodes the instruction code, or operation code, of each instruction word and forwards the operation code plus additional information derived from the instruction word to instruction execution queue 18 for storage. Since most operation codes require an operand, central unit pipeline 12 produces the address of a data word, or operand, and forwards the operand address to operand cache 20. After the operand is received from the operand cache, the operand and the instruction code are transmitted to the distributor 22. The distributor, by analyzing the operation code, typically by use of a table look-up technique, determines the execution unit to which the instruction and operand are to be forwarded, distributed, or ingated.

The four execution units of CPU 10 are the central execution unit (CEU) 24, the virtual memory system and Multics descriptor processing execution unit (VMSM) 26, the binary arithmetic execution unit (BINAU) 28, and the decimal character execution unit (DECCU) 30.

Each of the execution units 24, 26, 28 and 30, is capable of receiving instructions and operands, and processing them independently of the other execution units. Each of the execution units includes logic circuits which are optimized for performing that set of instructions assigned to it. In the preferred embodiment, central execution unit 24 performs basic computer operations, such as simple loads, adds, substracts, etc., and certain miscellaneous instructions. CEU 24 is unique among the four execution units in that it executes each instruction as received, i.e., within one clock period. As a result, central execution unit 24 is not provided with an input stack as are the other execution units illustrated in FIG. 1. VMSM execution unit 26 executes instructions relating to virtual memory, security and special instructions that are peculiar to a secure operating system. BINAU execution unit 28 executes binary arithmetic instructions, such as multiply, divide and floating point instructions. The decimal/character execution unit 30 executes alphanumeric, decimal arithmetic, and bit string instructions. Execution unit 26 is provided with, or has associated with it, an input stack 32; execution unit 28 is provided with an input stack 34; and execution unit 30 is provided with an input stack 36. The function of input stacks 32, 34 and 36 is to store the operation code and operands, if required, of instruction codes awaiting execution by its associated execution unit.

Each of the input stacks 32, 34, 36 is a conventional first-in, first-out stack having sixteen levels, with each level adapted to store a double data word, or two operands. In the preferred embodiment, each word has 36 bits so that a double word has 72 bits. In addition, the operation code of the instruction word to be performed, or executed, by the execution unit in whose stack the operand and instruction code are located is also stored in the input stack. The input stacks 32, 34, 36 of execution units 26, 28 and 30 are fifo, or first-in, first-out stacks, so that the first operation code and one or two operand words required for each operation code applied to a given execution unit is the first one read out of the input stack for execution by a given unit. Each of the execution units is also provided with a results stack. Results stack 38 is associated with the central execution unit 24, results stack 40 is associated with execution unit 26, results stack 42 is associated with the BINAU execution unit 28, and results stack 44 is associated with the execution unit 30. In the preferred embodiment, the results stacks are conventional first-in, first-out stacks, each of which has sixteen levels. The results of the operation of an instruction are stored in the stacks in the order in which they are executed. Each level of a results stack has the capability of storing a double word, as well as additional information with respect to the double word, as will be described in more detail below.

Results stacks 38, 40, 42, 44 are a part of collector 46, as are instruction execution queue 18 and collector control 47. The operational code of each instruction word in execution, along with other information, is a part of an instruction execution queue word illustrated in FIG. 5 and is stored in instruction execution queue 18, which, in the preferred embodiment, is a conventional first-in, first-out stack of sixteen levels, or layers.

The central pipeline unit structure 12 forwards the operation code of each instruction in program order to instruction execution queue 18 for storage therein. Up to sixteen instruction execution queue, IEQ, words can be stored in queue 18. Collector control 47 uses the operation code of each IEQ word to control the reading out of the results located, or stored, in the results stacks 38, 40, 42, 44 of each of the execution units 24, 26, 28, 30, so that the results in proper program order can be stored in either the master safe store, MSS, 48 or into store stack 50. Results that are stored in store stack 50 are for writes of operands to memory. Instructions which change program addressable registers of CPU 10 generate results that are stored in the master safe store 48, so that at such time as an interrupt, a fault, or a hardware error occurs, the contents of the program addressable registers of the CPU 10 are available in master safe store 48. The availability of current and valid contents of all program addressable registers greatly facilitates fault recovery, handling of interrupts, and retrying of instructions as appropriate.

Main memory 51 of the data processing system of which CPU 10 is a subsystem provides instructions for the instruction cache 16 and operands for operand cache 20. All stores, or writes, to main memory 51 are from data stored in operand cache 20. Thus, whenever data is to be written into memory as a result of an execution of an instruction, the necessary data, operands, are stored in store stack 50 in program order and are issued or written into the operand cache 20 in program order. As a block of operand cache 20 is released so that new data can be written into that block, the operand cache control will have data in that block of the cache written into main memory before new data is written into that block, as is well known in the art.

Figures 2, 4:
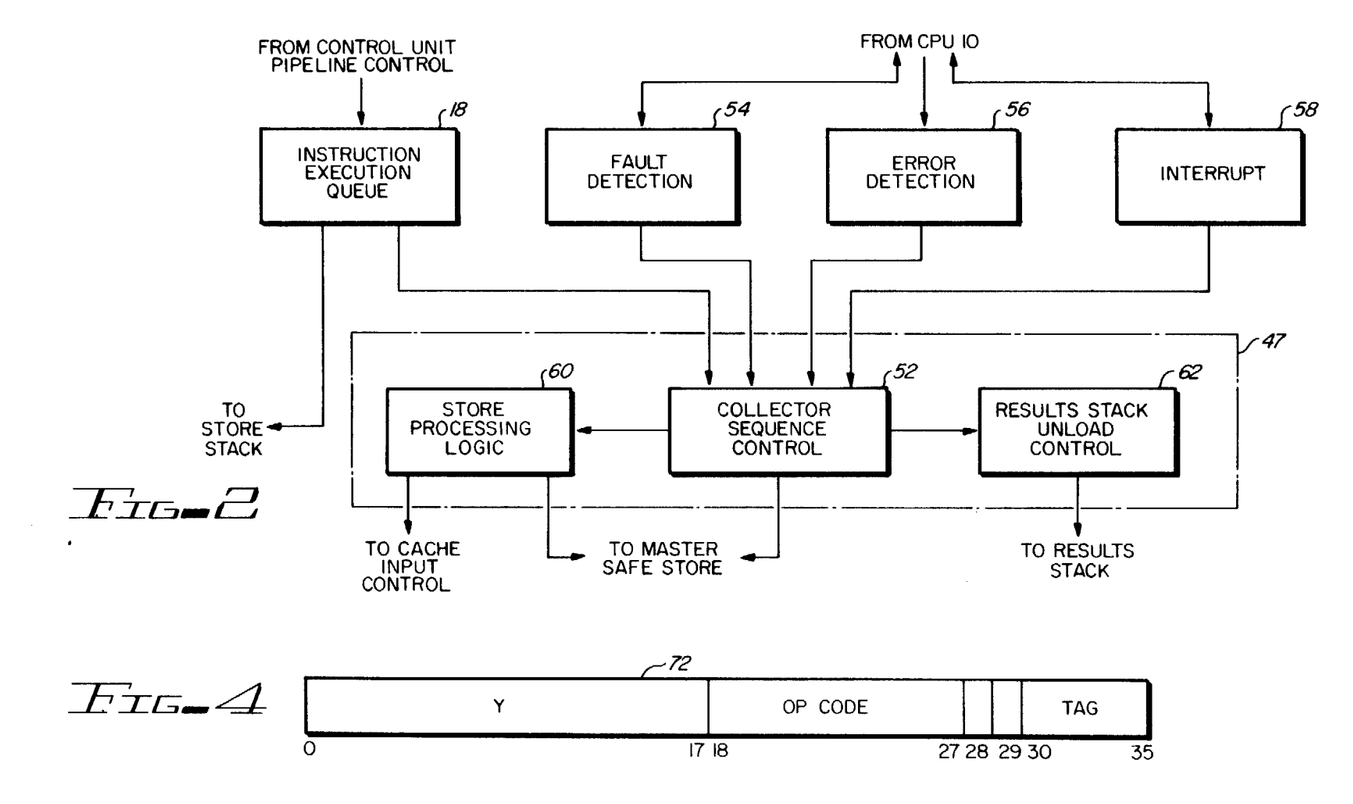
FIG. 2 is a block diagram of a portion of the collector of this invention.
FIG. 4 is the format of an instruction word.

In FIG. 2, a portion of the collector 46 is illustrated; more particularly, the instruction execution queue 18 and collector control logic circuitry 47 of collector 46. Collector sequence control 52 of collector control 47 has applied to it fault detection flags, error detection flags, interrupt flags from the fault detection circuit 54, error detection circuit 56, and interrupt detection circuit 58 of central processor 10. Collector sequence control 52 compares the instruction code of the first of the remaining instructions entered into queue 18 and from the instruction code determines, using a conventional table look-up technique, in which one of the result stacks the result of the execution of that instruction is located. Collector sequence control 52 causes the results of the first in time of the remaining instructions stored into the fifo results stack of that execution unit to be read out and written into either master safe store 48 or store stack 50 by appropriate control signals produced by collector control 47. If the results are to be written into main memory 51, the operand, or operands, is caused to be written into store stack 50, which, as described above, is a conventional sixteen entry first-in, first-out stack with each level having the capability of storing two operands or, in the preferred embodiment, seventy-two bits of data. If the next result to be read out of an execution unit in program order is a change in a software addressable register of CPU 10, then that change in a program addressable register will be stored in master safe store 48 with the register being designated by additional bits of information stored in the results stack along with the result of the execution of a given instruction.

Collector control 47 controls the reading out of the operands from result stacks 38, 40, 42, 44 and where they are to be stored, i.e., in master safe store 48 or in store stack 50. Input signals to collector sequence control 52 include the operation code stored in execution queue 18 of the next instruction in program order to be read from one of the execution units. Additional inputs to the collector sequence control 52 are fault detection flags from a source 54, error detection flags from source 56 which are conventional parts of the CPU 10, as well as interrupts from the I/O system, source 58. Collector control 47 then compares the execution code of the next instruction to be read out of execution queue 18, which code is transferred to collector sequence control 52. From the operational code, the collector sequence control determines which execution unit should have executed that particular instruction and because of the order in which the instructions are applied to the execution units and to the instruction execution queue, the next result to be read out of the fifo results stack of the execution unit capable of executing that instruction will be the result of the execution of that instruction. If there is an operand, or operands, in the lowest level of that result stack, then collector sequence control 52 will issue the appropriate control signals to gate the operand, or operands, from the appropriate result stack and will also issue appropriate control signals to store the operand in either master safe store 48 or store stack 50. If the instruction is a write to memory, the result from the selected result stack is written into store stack 50. If the result of the selected instruction is a change in a program visible register, the result of the selected instruction will be stored in a portion of master safe store 48 designated to store the contents of the register changed by that instruction. That portion of master safe store 58 into which a change in a program addressable register is written is determined by additional binary data stored with the operand in the result stack.

Figure 3:
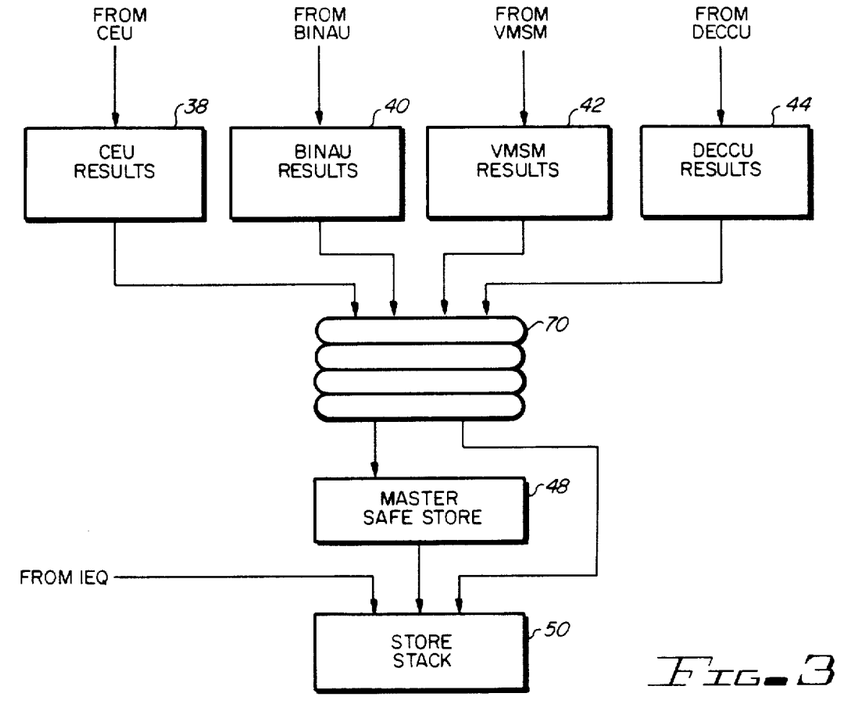
FIG. 3 is a block diagram of another portion of the collector of this invention.

In FIG. 3, additional details of collector 46, particularly the circuit connections between the result stacks 38, 40, 42, 44 and the master safe store 48 and the store stack 50 are illustrated. The results of the execution of an operation code by an execution unit, such as central execution unit 24, are transmitted to CEU result stack 38 and from it to a set of switches 70 when CEU result stack 38 is enabled by a control signal from collector control 47. The result will be stored in master safe store 48 if it is enabled by control signals from collector control or in store stack 50 if it is enabled. The foregoing is true for each of the result stacks 40, 42 and 44 also. Between result stacks 38, 40, 42 and 44 and the master safe store 48 and store stack 50, there is located a 1 of 4 select switch 70. Selector switch 70 selects, or determines, which signals, i.e., those from which result stack will be transmitted to master safe store 48 or store stack 50.

FIG. 4 illustrates the format of an instruction word 72 for CPU 10. The first 18 bits, denoted Y, bit positions 0 through 17, are the address of the operand on which an operation is to be performed. Bits 18 through 27 constitute the operational code which uniquely identifies the instruction to be performed. Bit 28 is an interrupt inhibit bit which, when a logical 1, inhibits an interrupt from being serviced, or recognized, while an execution unit is executing that operation code, or instruction. Bit 29 specifically refers to segments external to the current instruction segment. The tag field, bit positions 30 through 35, is generally used to control address modification.

Figure 5:
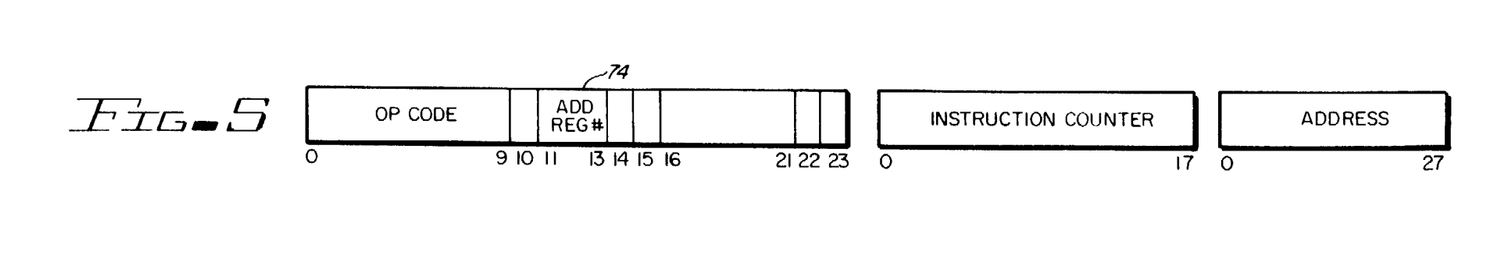
FIG. 5 is the format of an information execution queue word.

FIG. 5 is the format of an information execution queue (IEQ) word 74, one of which can be stored in each of the 16 levels of instruction execution queue 18, a fifo stack. In IEQ word 74, bit positions 0 through 9 are the operational code of the instruction word 77 as illustrated in FIG. 4. Bit 10 indicates the location of the operand within a double word, i.e., whether it is the first or the second of the two words. Bits 11 through 13 identify the address registers into which the result of the execution of the operation code is to be written. Bit 14 corresponds to instruction word bit 28, the interrupt inhibit bit. Bit 15 is the same as instruction word bit 29. Bits 16 through 21 constitute instruction word bits 30 through 35, or the tag. Bit 22 is instruction word bit 9, a truncation fault enable bit, and bit 23 indicates the store of A/Q with character modification. In addition, the instruction word address, or the contents of the instruction counter of CPU 10, is a part of IEQ word 74, an 18-bit binary number, as is the memory address needed for a write command which, in this example, is a 28-bit binary number.

Figure 6:
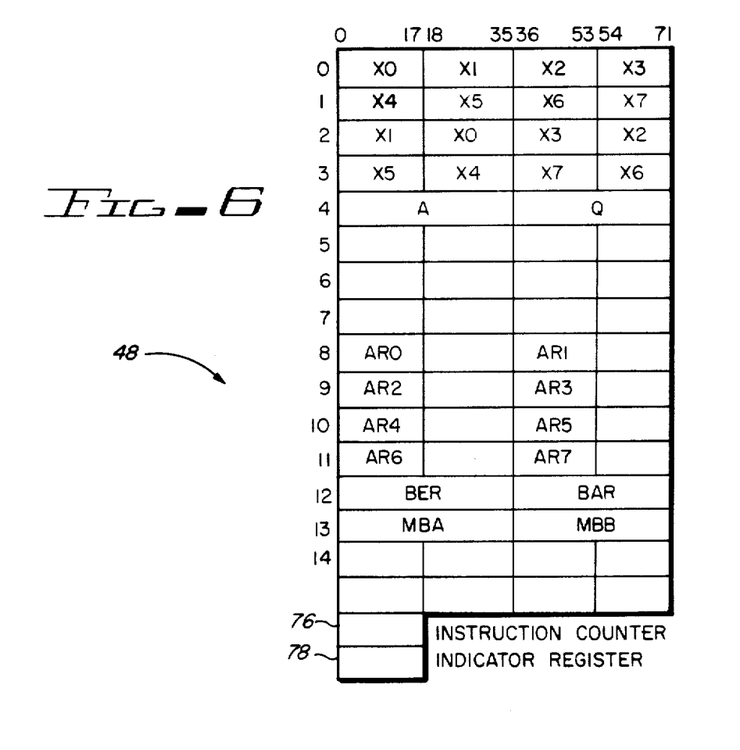
FIG. 6 is a schematic illustration of a master safe store register illustrating the positions in the register in which the contents of program visible registers are stored.

FIG. 6 illustrates the location in master safe store 48 in which the contents of the various program addressable registers are stored. In the registers indicated, an X denotes an index register, A the accumulation register, Q the quotient register, AR 0-7 address registers, BER a base extension register, BAR a base address register, MBA and MBB master base registers A and B. The instruction counter or the address of the last instruction loaded into the master safe store is placed in portion 76, and the current contents of the CPU indicator register are stored in portion 78 of master safe store 48.

The repertoire of instructions for processor 10 consists of several classes of operation codes, or instructions. Some of these operation codes can be deemed to be basic operations, i.e., simple loads, adds, subtracts, etc., which require but one clock period to execute. Other classes are floating point, multiply and divide, both floating point and fixed point, address register modification, shifts and rotates, decimal arithmetic, alphanumeric, bit string, virtual memory and security-related, store and miscellaneous instructions. Processor 10 is physically and functionally divided along these same lines with each execution unit having a highly optimized set of logic for executing the class of instructions assigned to it.

The central unit pipeline structure 12 controls the overall operation of processor 10 and has the function of sending operation codes, or commands, and associated operands to the various execution units 24, 26, 28, 30, where the actual execution of each operation code is performed. The instruction fetch unit 14 under the control of the center unit pipeline structure 12 fetches instructions from the instruction cache 16 and forwards the instruction word to the central unit pipeline structure 12. The central unit pipeline 12 decodes the instructions, fetches the operands from the operand cache 20, and sends the operation code and operands to one of the execution units 24, 26, 28, or 30. Within the central unit pipeline structure 12 are performed instruction preprocessing, instruction decode, operand address formation, including paging and search of an associative memory. Structure 12 also controls cache 20.

The execution units 24, 26, 28, 30 receive commands from the central pipeline unit 12 operands from the cache 20 and perform, or execute, the instruction code. The execution of an instruction generally involves the formation of some result based upon current register contents and the input operand which produces a change to a program visible register or to memory.

Processor 10 is divided into four major execution units, each of which is made up of one or more subunits. These units are (1) the central execution unit, CEU 24, (2) the binary arithmetic unit, which performs floating point and multiply and divide instructions, BINAU 28, (3) the decimal character unit, DECCU 30, and (4) the virtual memory, security and miscellaneous unit, VMSM 26. Each of the execution units 24, 26, 28, 30 receives instructions and operands and processes them independently of what any of the other execution units may be doing.

Execution units 26, 28 and 30 each have an input stack 32, 34, 36, a 16-level fifo stack with each stack capable of holding two data words, or operands. A double-word in the preferred embodiment comprises seventy-two bits plus parity bits. In addition, each level holds an associated operation code. Thus, an input stack can hold up to sixteen commands and operands awaiting execution by the execution unit to which the stack is assigned. It might be noted that the decision as to which execution unit receives, or is assigned, a given instruction and its associated operands is determined by distributor 22 by examining the operation code of the instruction. The particular method used in the preferred embodiment is the table look-up technique. Input stacks 32, 34, 36 allow central pipeline structure 12 to issue operands and associated operation codes to the execution units at the rate of one per clock period, without waiting for completion of the execution of preceding multiple execution cycle instructions, for example. Such an arrangement also allows execution of instructions in the different execution units to be overlapped. However, within an execution unit there is no overlap. Each instruction code is always executed in the order it is received from the pipeline unit 12 and forwarded to distributor 22.

The system architecture of processor 10, i.e., having several execution units, requires that several copies of the major registers, for example the A and the Q, be kept. As processing proceeds, the valid copy of a particular register may be in any one of the execution units or in any one of several different register banks within processor 10. Central unit pipeline structure 12 maintains a record of the currently valid copy for each register and recognizes when the execution of the next instruction requires transferring a copy of the contents of a register from one execution unit to another. However, maintaining a valid copy of the contents of a particular register is complicated by the length of pipeline 12, which is five instructions deep.

The ability to determine the contents of each addressable register immediately prior to the occurrence of a fault is a requirement for prompt fault recovery. In any pipeline computer, processing of any one instruction is overlapped with the processing of several other instructions in different stages of execution. In addition, in CPU 10 of the execution of several instructions may simultaneously occur in different execution units. As a result, at any one time, the registers in pipeline 12 and in execution units 24, 26, 28 and 30 could contain register changes resulting from the processing and execution of several different instruction codes.

When an instruction fault or an interrupt occurs, pipeline 12 must be halted at the end of the last instruction before the fault or interrupt occurred. All register changes as the result of the execution of instructions in program order prior to the fault or interrupt should be completed, and any program visible register changes or changes to memory as the result of the execution of later in program order instructions must be canceled or deleted. Collector 46 provides a valid, current copy of each of the program addressable registers to facilitate fault recovery and for handling interrupts.

Collector 46 consists of execution result stacks 38, 40, 42, 44, instruction execution queue 18, master safe store 48 in which the contents of all program visible registers of CPU 10 are stored, store stack 50 through which the operands to be written into memory and their addresses are transmitted for storage in the operand cache 20, and collector control 47. Each execution unit 24, 26, 28, 30 has its own result stack 38, 40, 42, 44. As each execution unit completes the execution of an instruction, it forwards to its associated results stack 38, 40, 42, or 44, an updated copy of any program visible registers which were changed by that instruction or any change to memory 20. These register changes are stored in the 16-level fifo stack constituting result stacks 38, 40, 42, 44 in the order they are received in the execution results stack. Likewise, the result of any store instruction executed by central execution unit 24 is also placed in result stack 38 of CEU 24 in program order. Thus, each result stack contains a record of up to the last 16 program visible register changes or changes to memory, or both, in program order, i.e., the first in will be the first out, or the result that is stored in a result stack the longest will be the first one read out of the stack.

The master copy of all program visible registers is maintained in the master safe store 48. Master safe store 48 is a register bank in which valid copies of the contents of the program visible, i.e., program addressable, registers are stored. The locations in which the contents of each such register are located in MSS 48 are illustrated in FIG. 6. Collector 46 through collector control 47, which includes the collector sequence control 52, store processing logic 60, and result stack unload control 62 takes results, register changes or stores out of the execution results stacks one at a time and copies them into master safe store 48 or sends them to the store stack 50 for writing into the operand cache 20 in program order. An important aspect of collector 46 is that all program visible register changes are received by and all stores to memory 20 pass through collector 46.

In order to properly handle a fault, it is necessary to stop the operation code, or instruction, processing so that to the computer program it appears that no instruction following the faulting instruction has been executed. When a fault or interrupt occurs, a flag denoting the fault is set in the level of the result stack of the execution unit in which the results of the instruction in which the fault occurred is stored. When the collector sequence control identifies that a fault flag is stored with the results of the next instruction in program order to be stored in either master safe store 48 or store stack 50, the results at that level and all results of instructions subsequent thereto in program order will be discarded. It should be noted though that collector 46 will continue to unload the results stacks of execution units and to transfer changes in program visible register to master safe store 48 or to store stack 50 and thence to the operand cache 20 until the result in which the fault occurred is reached in the instruction stream, or in program order. Thus, at the time collector 46 senses, or recognizes, a fault, both operand cache 20 and master safe store 48 are in the correct state, i.e., have valid copies of program visible registers and only valid data has been written into operand cache 20 preparatory to being written into memory 51. The data in MSS 48 is available for subsequent fault processing in order to recover therefrom. The master copy of the registers in master safe store 48 is the only valid copy of such registers, and any outstanding stores to the cache including that instruction in which the fault occurred and any subsequent are canceled. CPU 10 then begins the normal process of fault recovery.

The record of the proper program order for all instructions in execution, or being processed, by CPU 10 is maintained in the collector's instruction execution queue 18. Instruction execution queue 18 contains one entry for each instruction in process. Entries into master safe store 48 and into the store stack 50 are ordered so that they are unloaded in proper program order, i.e., the same order in which the instructions are stored into the instruction execution stack 18 by the central pipeline structure 12. Instruction execution queue word 74 contains the operation code of the instruction and identifies, using a table look-up technique, the execution result stack in which the result of that instruction when executed is, or will be, entered. The result of each instruction executed is then transferred from the appropriate result stack to master safe store 48 or to store stack 50 in program order. Thus, in collector 46 instructions are completed, i.e., the results of each are received and arranged in the proper, or program, order.

In addition to handling fault recovery and interrupts, collector 46 also performs the actual execution of all memory store instructions. Master safe store 48 contains a copy of all program visible registers, so it is a convenient place to obtain the contents of program visible registers which are to be written into memory. Handling store instructions in collector 46 with the data to be written into memory 51 coming from either master safe store 48 or execution unit result stacks via store stack 50 maintains program order and avoids the necessity of the execution units 24, 26, 28 and 30 from being involved in store instructions. In this sense, collector 46 is another execution unit for processing stores. As a result, simple stores can be overlapped with the execution of any other instruction taking two or more clock periods. The information stored in master safe store 48 also makes it relatively easy for CPU 10 to retry hardware instructions.

Instruction execution queue 18 is a first-in, first-out stack containing an entry for every outstanding instruction of central processor 10. The order of entry of each of the IEQ words 74 in instruction execution queue 18 controls the completion of instructions by controlling the order of unloading of the results of the execution of each operation code from the result stacks 38, 40, 42, 44. Instruction execution queue 18 also contains the contents of the instruction counter for each operation code and the address in memory 51 into which stores are made from store stack 50.

The execution unit results stacks 38, 40, 42, 44 are first-in, first-out stacks in which the results from the execution of each operation code by an execution unit are stored. An instruction, or operation, code is completed when the result of any register change has been recorded in the master safe store or any changes to memory have been transferred to the store stack 50. Fault flags and indicator register changes of associated execution units are also contained in each entry in the execution result stack for each execution unit.

The master safe store 48 contains the final or correct copy of all program visible registers in CPU 10 plus such program visible but generally miscellaneous registers such as the instruction counter and the indicator register as indicated in FIG. 6. All changes in program visible register of CPU 10 are reflected in the information stored in master safe store 48. Changes to master safe store 48 are completed in program sequence as each IEQ word 74 is removed from instruction execution queue 18 and the results of the execution of the operation code of that IEQ word are removed from the appropriate result stack. In the normal operation of CPU 10, results are held in the result stacks 38, 40, 42, 44 long enough so that there is a high probability that no fault has occurred in the processing of that instruction. Then, if no fault is detected by collector control 48, the results are transferred to master safe store 48 or to store stack 50.

Data to be written into memory 51 can come from master safe store 48 by transferring such data to store stack 50 on simple store instructions or from the execution result stacks for all other stores. Store instructions executed from data in the master safe store take no time in any of the execution units and only one pipeline cycle is required to enter a store instruction in the instruction execution queue.

There are two ways in which a fault can be signalled to the result stack unload control 62. Faults that can be flagged with the result of an instruction are entered in the same entry as the result in the results stack of the execution unit in which the fault occurred or was detected. This is done by raising an execution fault flag on the input to the appropriate result stack, entering the fault type in the execution unit's fault type register, and entering a five-bit fault code in the execution unit's fault code register. This type of fault signalling is used by the execution units for any fault where the fault signal can be placed in the result stack, either with or in place of the data associated with the normal processing of an instruction.

For interrupt handling, an interrupt present line from the I/O portion of the data processing system signals CPU 10 that an interrupt must be handled. Logic circuit 62 checks the interrupt inhibit bit of the last instruction unloaded. If the interrupt inhibit bit is a one, or on, then collector 46 will continue to unload the results stack. If the interrupt inhibit bit is off, it will acknowledge the interrupt, stop further unloading of any results in the results stack, and invoke interrupt processing.

The removal or the storage of results into master safe store 48 if it is a change to a program visible register or into the store stack if it is a write to memory are controlled by execution queue words 74 stored in the first-in, first-out stack of instruction execution queue 18.

In those instances where the information stored in the master safe store is to be written into memory, the data is transferred from master safe store register 48 into store stack 50 and then the address from IEQ stack 18 and the data to be stored are forwarded to the operand cache 20. Operand cache 20 will, when the block of the cache into which data has been written is being released by cache 20, before releasing that block write the data in that block into memory 51. The information contained in the results stacks, particularly that for storage in the master safe store 48, will include, in addition to the contents of the register that have been changed by the instruction, the contents of the instruction counter of the last instruction read out of IEQ 18.

From the foregoing, it is seen that this invention provides a mechanism for collecting in proper program order instruction results from a plurality of execution units which are executing instructions in parallel. The collector also maintains a master copy of program visible registers and performs the execution of store instructions. Collector 46 aids by providing the contents of the MSS 48 to aid in interrupt, fault, or error processing and in assisting CPU 10 in recovering because it contains a valid copy of the program visible registers of CPU 10 as they existed prior to the interrupt, fault, or error.

It should be evident that various modifications can be made to the described embodiment without departing from the scope of the present invention.

What is claimed is:

1. A collector for a synchronous central processing unit (CPU) of a data processing system having program addressable registers, a memory, said CPU having a repertoire of instructions and a plurality of execution units, wherein each of said execution unit executes a different subset of the repertoire of instructions independently of and in parallel with the other execution units and each executes the instructions in the order in which instructions are received by each such execution unit, said CPU having means for issuing in program order instructions to the collector and to the execution unit capable of executing the issued instruction; each execution unit that executes any instructions that requires more than one clock period having associated with it an input stack for storing instructions awaiting execution by its associated execution unit in the order received, the number of clock periods required to execute each instruction differing such that the results of the execution of instructions of a given program by the instruction execution units are not produced in program order; the collector comprising:

means for storing in program order instructions issued by the means for issuing instructions to the collector;

result means associated with each of said execution units for storing a plurality of results of the execution of instructions by its associated execution unit in the order executed;

a master safe store and a store stack for storing the results in program order of the execution of each instruction executed by the execution units; and collector control means responsive to the order in which instructions are stored in the means for storing in program order instructions for causing results stored in the result means associated with each execution unit to be stored in program order in the master safe store if the results change the contents of an addressable register and to be stored in the store stack in program order if the results are to be written into memory.

2. A collector as defined in claim 1 in which result means associated with each execution unit is a fifo stack.

3. A collector as defined in claim 2 in which the means for storing in program order instructions issued by the means for issuing instructions is a fifo stack.

4. A collector as defined in claim 3 in which the master safe store and store stack is a fifo stack.

5. In a central processing unit (CPU) of a synchronous digital data processing system having a memory, said CPU having program addressable registers, a repertoire of instructions, a plurality of execution units, wherein each of said execution unit executes a different subset of the repertoire of instructions independently of and in parallel with the other execution units and each executes the instructions in the order received, at least one of said execution units executing a subset of the instructions that can be executed in one clock period, the number of clock periods required to execute each instruction differing such that the results of the execution of instructions of a give program by the instruction execution units are not produced in program order, said CPU having means for issuing instructions in program order, said means for issuing instructions in program order issuing instructions to the execution unit capable of executing the issued instruction, the improvements comprising:

an instruction execution queue (IEQ) for storing the operation code of each instruction issued by said means for issuing instructions in program order;

an input stack associated with each execution unit except the unit which executes the subset of instruction repertoire that is executable within one clock period;

a results stack associated with each execution unit for storing the results of the execution of instructions by its associated execution unit in the order executed;

a master safe store and a store stack for storing the results in program order of the execution of each instruction executed by the execution units; and collector control means responsive to the order in which instructions are received by the instruction execution queue for causing results stored in the result stacks associated with each execution unit to be stored in program order in the master safe store if the results change the contents of an addressable register and to be stored in the store stack in program order if the results are to be written into memory.

6. In a central processing unit as defined in claim 5 in which the instruction execution queue is a fifo stack.

7. In a central processing unit as defined in claim 6 in which the input stack associated with an execution unit is a fifo stack.

8. In a central processing unit as defined in claim 7 in which the result stack of each of the execution units is a fifo stack.

9. In a central processing unit as defined in claim 8 in which the store stack is a fifo stack.

10. In a central processing unit as defined in claim 9 in which each of the fifo stacks is a sixteen-level stack.

11. A collector for a synchronous central processor unit (CPU) having program addressable registers, a memory, a repertoire of instructions, said CPU having a plurality of execution units, wherein each of said execution unit executes a different predetermined set of operation codes of the instruction repertoire independently of and in parallel with the other execution units and each executes the instructions in the order in which instructions are received by each such execution unit, the number of clock periods required to execute each instruction differing such that the results of the execution of instructions of a given program by the instruction execution units are not produced in program order, said CPU having means for issuing in program order instructions to the execution unit capable of executing the operation code of each instruction so issued, and means for issuing in program order instruction execution queue words which include the operation code of each instruction issued to the execution unit; said collector comprising:

an instruction execution queue (IEQ) for receiving instruction execution queue words from the means for issuing instruction execution queue words;

a plurality of result stacks, one result stack being associated with each execution unit; each execution unit results stack receiving the results of the execution of each operation code by its associate execution unit;

a master safe store and a store stack for storing the results in program order of the execution of each instruction executed by the execution units; and collector control means responsive to the order in which instructions are received by the instruction executin queue for causing results stored in the result stacks associated with each execution unit to be stored in program order in the master safe store if the results change the contents of an addressable register and to be stored in the store stack in program order if the results are to be written into memory.

12. A collector for a central processor as defined in claim 11 in which the instruction execution queue is a fifo stack.

13. A collector for a central processor as defined in claim 12 in which each of the plurality of result stacks is a fifo stack.

14. A collector for a central processor as defined inn claim 13 in which the control means comprises store processing logic, collector sequence control, and results stack unload control.

15. A collector for a synchronous central processor unit (CPU) of a data processing system having a system memory, said CPU having a repertoire of instructions, the CPU having a plurality of execution units, each execution unit having program addressable registers, wherein each execution unit executes a different predetermined subset of operation codes of the repertoire of instructions, each instruction requiring a number of clock periods to execute, the minimum number of clock periods to execute an instruction being one, the subset of instructions executed by one of said execution units being limited to those that can be executed in one clock period, The number of clock periods required to execute each instruction differing such that the results of the execution of a given program by the instruction execution units are not produced in program, order, said CPU having means for issuing in program order instructions to the execution unit capable of executing each operation code issued to it, and means for issuing in program order instruction execution queue (IEQ) words which include the operation code of each instruction issued to an execution unit; an input stack associated with each execution unit other than said one unit which executes the subset of instructions which require only one clock period to execute, said input stacks storing instructions issued to its associated execution unit in the order received and holding said instructions until executed, said collector comprising:

an instruction execution queue adapted to receive and store IEQ words from the means for issuing IEQ words in the order issued;

a plurality of result stacks, one such result stack being associated with each execution unit, each execution unit result stack receiving the results of the execution of operation codes by the execution unit with which it is associated in the order executed;

a master safe store for storing changes to the contents of program addressable registers in program order;

a store stack for storing the results in program order of the execution of each operation code that changes data to be stored in system memory; and collector control means responsive to the order in which operation codes are received by the instruction execution queue for causing results stored in the result stacks associated with the execution units to be stored in program order in the master safe store if the result changes the contents of a programmable addressable register and in the store stack in program order if the results change the data stored in a memory location in system memory.

16. A collector as defined in claim 15 in which the instruction execution queue is a fifo stack.

17. A collector as defined in claim 16 in which each of the result stacks is a fifo stack.

18. A collector as defined in claim 17 in which the store stack is a fifo stack.

19. A collector as defined in claim 18 in which the collector control means comprises store processing logic, collector sequence control, and results stack unload control.

* * * * *